Nov. 18, 1952     H. SCHNEIDER     2,618,164
POWER TRANSMISSION
Filed Dec. 21, 1945     4 Sheets-Sheet 1
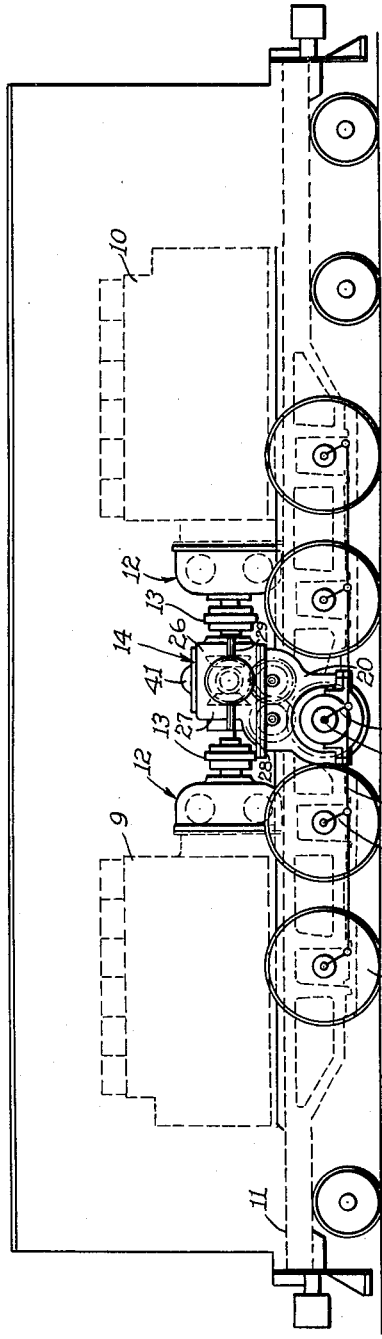
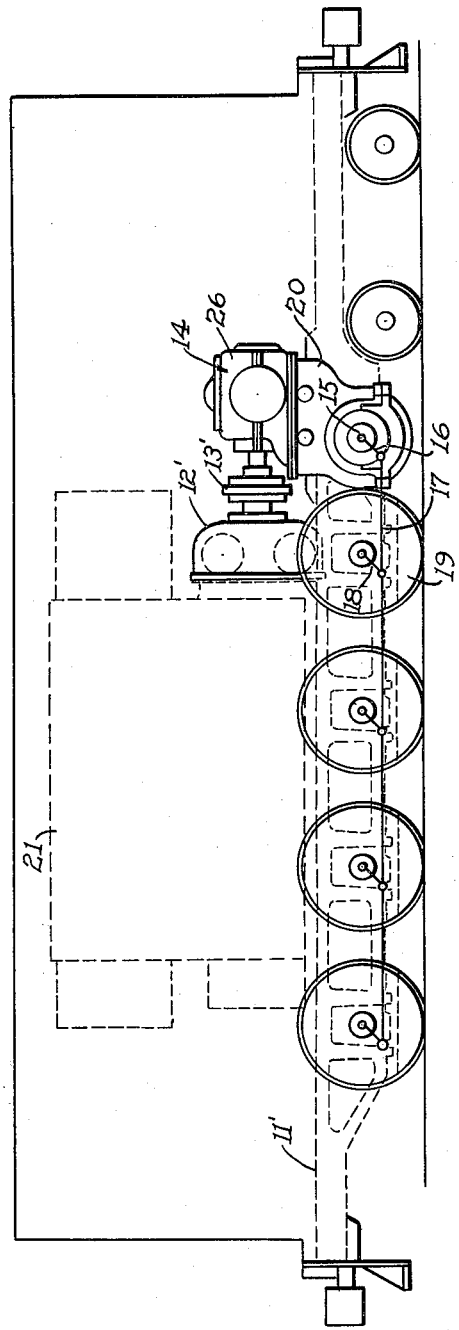
Inventor
Heinrich Schneider
By Andrew F. Wintercorn
Atty.

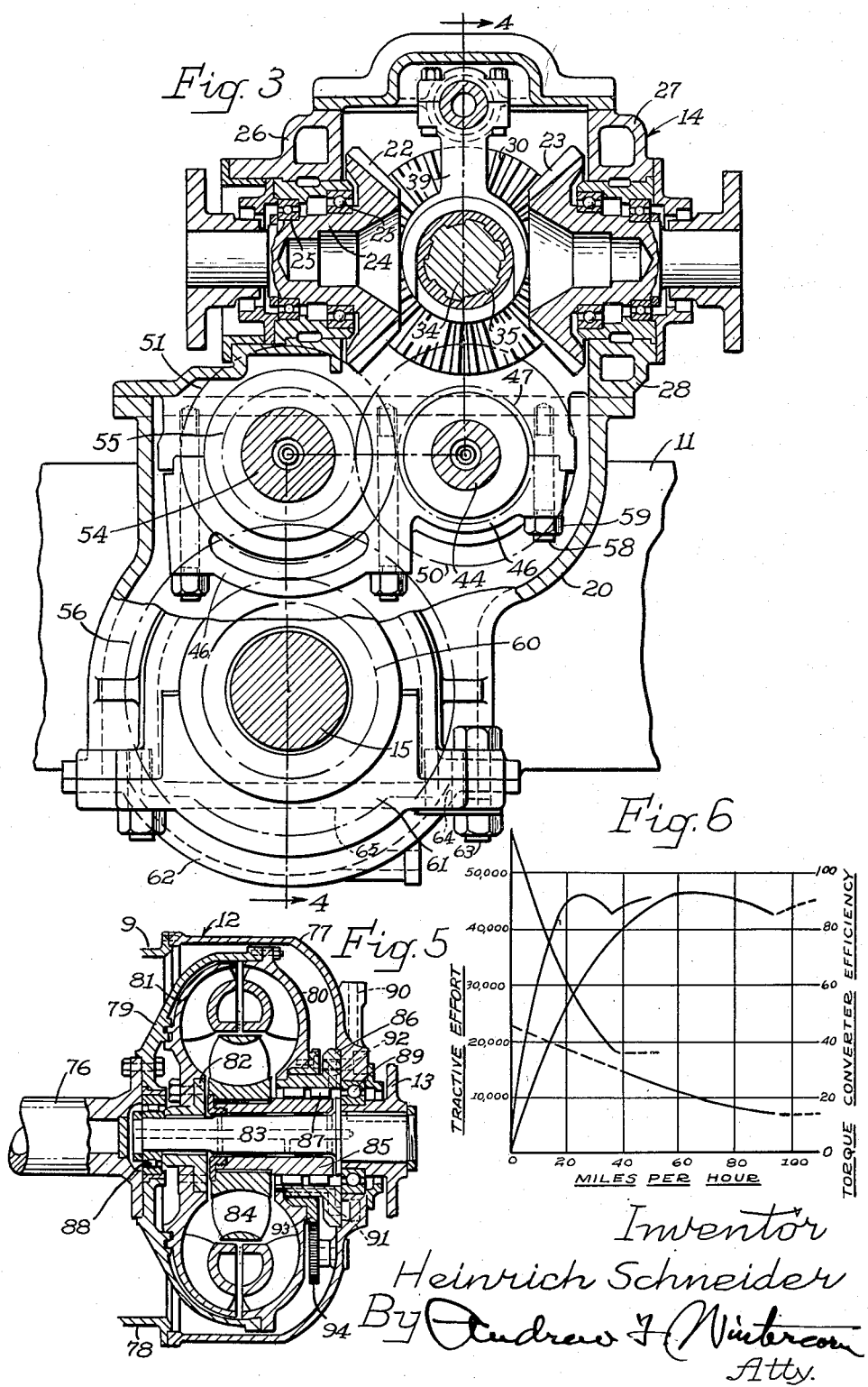

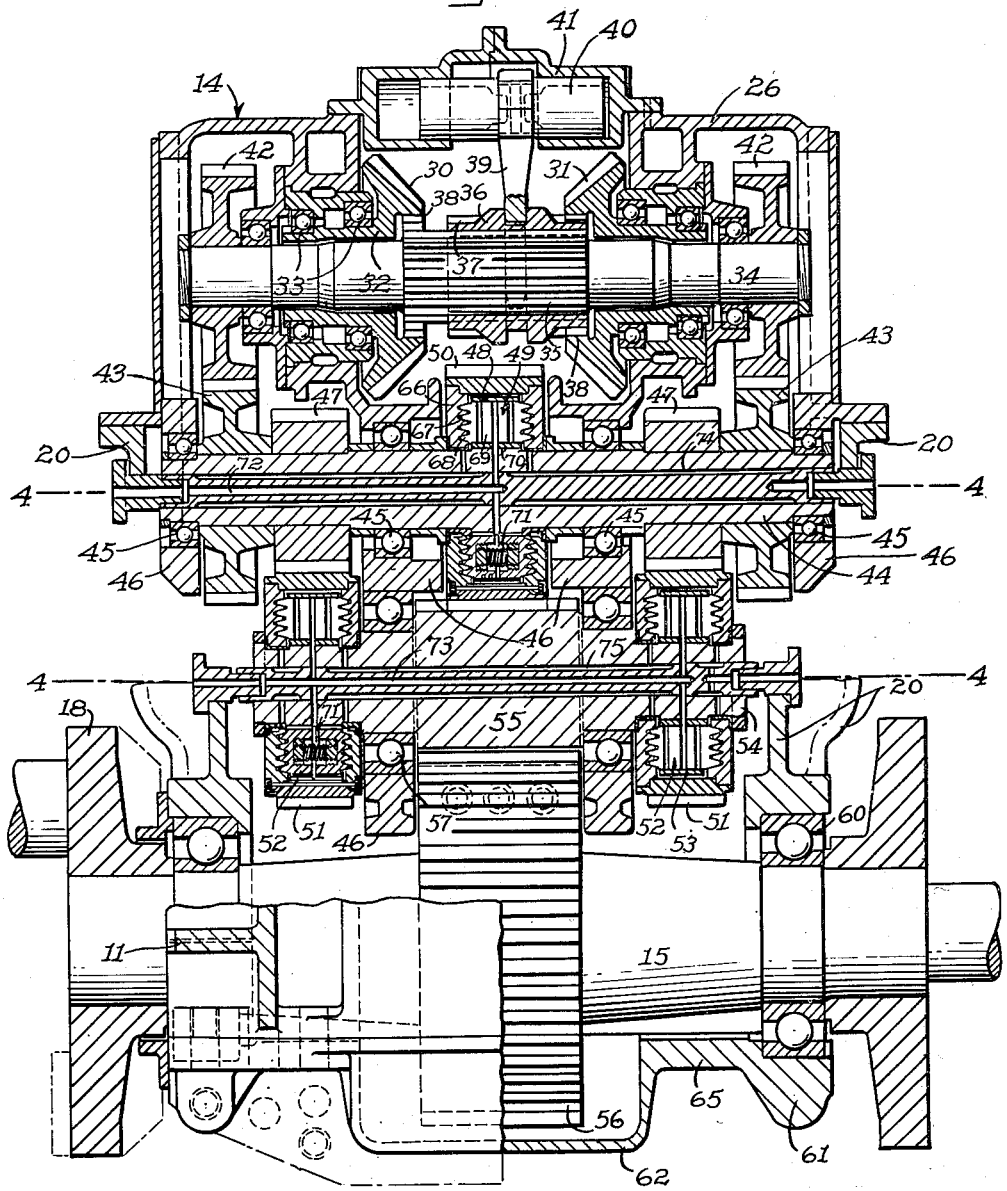

Nov. 18, 1952  H. SCHNEIDER  2,618,164
POWER TRANSMISSION
Filed Dec. 21, 1945  4 Sheets-Sheet 4

Inventor
Heinrich Schneider
By Andrew F. Wintercorn
Atty.

Patented Nov. 18, 1952

2,618,164

UNITED STATES PATENT OFFICE 2,618,164

POWER TRANSMISSION

Heinrich Schneider, Chicago, Ill., assignor to Schneider Brothers Company, a copartnership Application December 21, 1945, Serial No. 636,336

27 Claims. (Cl. 74—360)

This invention relates to power transmissions, and is more particularly concerned with hydromechanical power transmissions especially designed and adapted for use in diesel locomotives and affording a multiple speed reversible gear drive for the wheels of the locomotive, the said transmissions including clutches and reverse gears in combination with a torque converter, preferably of the hydraulic turbine type.

This invention is particularly concerned with transmissions suitable for use in high-powered diesel locomotives of say from 1,000 to 3,000 H. P. Previous designs for transmitting such large diesel power to the driving wheels of a locomotive through reduction gears for two or more speeds have not been satisfactory, principally because of the difficulty of designing such a high-powered transmission of sufficiently compact size to be housed within the frame of the locomotive. A salient feature of the transmission of my invention, which accounts for its unusual compactness, is the symmetrical arrangement of the gears, including four bevel gears in mesh with each other and forward and reverse clutch means in combination therewith, and spur gears with friction clutches within the gears, together with means for engaging and disengaging the low and high-speed reduction gear drives.

Another important feature of the present transmission is the improved arrangement of gears and clutches in a housing formed partly by the main frame of the locomotive and partly by an upper housing mounted on top of the frame housing, the gears being arranged on four shafts in said housings, namely, a bevel gear reverse shaft, a high-speed clutch shaft, a low-speed clutch shaft, and the final driven shaft, this latter shaft being preferably a crank shaft carrying the final large driven gear fixed or flexibly mounted on it, although it may also be constructed as a quill drive shaft carrying driving wheels and cranks, as used in electric locomotives.

In diesel locomotive power transmissions, another difficulty was presented in the mounting of the shafts carrying the gears in the housing. When these shafts are mounted in the main frame of the locomotive, it is difficult to remove them for inspection, replacement and service, and the boring of the main housing becomes expensive because of the size of the main frame. In accordance with my invention, this difficulty is avoided by arranging the gears and shafts in a separate housing placed on top of the main frame, one of the gears in the upper housing engaging the main gear on the crank shaft which is mounted in the main frame for easy removal by taking off the lower gear cover and lowering the crank shaft, this arrangement giving the further advantage of adding strength and stiffness to the locomotive frame with the lower cover bolted and wedged or doweled to the lower housing in the main frame. The boring of the main frame for the bearings of the crank shaft does not present a serious problem and can be done at relatively low cost.

Another feature of the invention is the combination and arrangement of the drive gear unit with one or two engines and one or two torque converters with flexible couplings between the gear unit and converters.

Other features of the invention will soon appear in the course of the following description in which reference is made to the accompanying drawings, in which—

Fig. 1 is a diagrammatic view of a locomotive having opposed diesel engines, the locomotive embodying a power transmission made in accordance with my invention;

Fig. 2 is a similar view of another locomotive having a single high-powered diesel engine and embodying a power transmission made in accordance with my invention;

Fig. 3 is a longitudinal cross-section in a vertical plane through the transmission of Fig. 1;

Fig. 4 is a cross-section taken on the broken line 4—4 of Fig. 3;

Fig. 5 is a vertical section through one of the torque converters shown in Fig. 1;

Fig. 6 is a set of tractive effort curves showing the performance of the transmission of Figs. 1, 3 and 4;

Similar reference numerals are applied to corresponding parts throughout the views.

Figure 7:
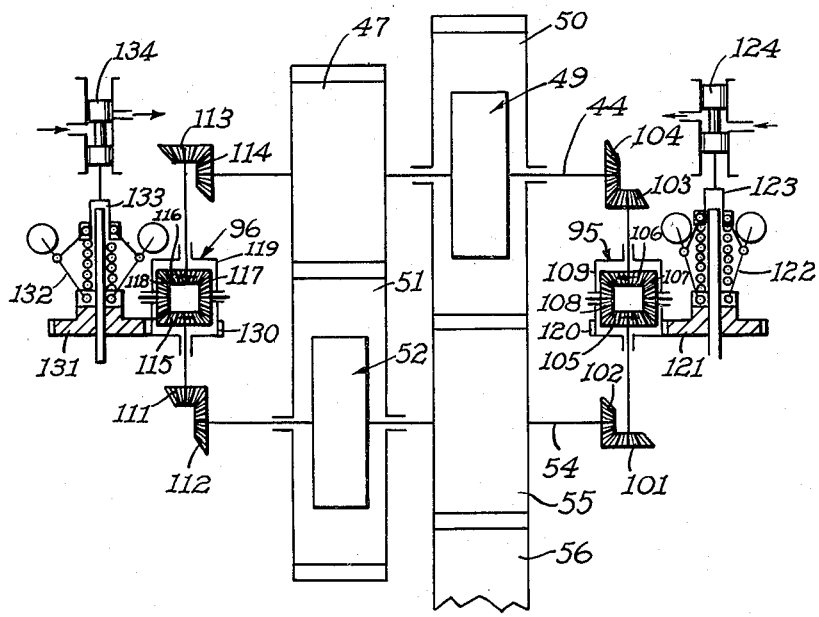
Fig. 7 is a diagram of the means for blocking the high-pressure oil from reaching the clutch as long as both members of the clutch rotate with a relative speed above a predetermined speed.

Referring first to Fig. 1, two diesel engines 9 and 10 are illustrated in opposed relation on the frame 11, each transmitting drive through a torque converter 12 and universal coupling 13 to the drive gear unit 14. The engines 9 and 10, it may be assumed, will each be of from 1,000 to 1,500 H. P. The jack shaft 15, which is also called the final driven shaft, being the terminal shaft in the drive gear unit 14, carries the cranks 16 on its opposite ends connected to connecting rods 17 which in turn are connected to cranks 18 on the two sets of four driving wheels 19 of the locomotive. The main housing 20 of the drive gear unit 14 is preferably integrally cast or welded to the frame 11 of the locomotive.

Referring to Fig. 2, a high-powered diesel engine 21 of say 2,000 H. P. is shown mounted on the frame 11' of the locomotive transmitting drive through a torque converter 12' and universal coupling 13' to a drive gear unit 14, the housing 20 of which is integrally cast or welded to the frame 11'. The jack shaft 15 of unit 14 transmits drive through cranks 16 and connecting rods 17 to the two sets of four driving wheels 19 through cranks 18 thereon.

Referring now to Figs. 3 and 4, the opposed bevel gears 22 and 23 are each driven by one of the diesel engines 9 and 10 of Fig. 1 through a torque converter 12. The two bevel gears 22 and 23 have their stub shafts 24 mounted in bearings 25 in the upper housing 26 of the drive gear unit 14, said upper housing consisting of an upper part 27 and lower part 28 having circumferentially extending flanges 29 that are suitably bolted together.

The two bevel gears 22 and 23 mesh with opposed bevel gears 30 and 31, the hollow stub shafts 32 of which are mounted in bearings 33 in the upper housing 26. A cross-shaft 34, which is also called the reverse shaft, has splined middle portion 35 between the gears 30 and 31 and extends through the hollow stub shafts 32 of these gears, as clearly appears in Fig. 4, and a splined clutch collar 36 is slidable on this splined portion and has clutch teeth 37 on both ends to mesh with clutch teeth 38 in either of the bevel gears 30 and 31. A shifter fork 39 operates the clutch collar 36 and is in turn operable by opposed pistons 40 working in cylinders 41 mounted on top of the housing 26. The pistons 40 are operable by means of air pressure admitted selectively to the outer end of either of the cylinders 41, depending upon which way the collar 36 is to be moved. In Fig. 4 the collar 36 is shown engaged with bevel gear 31 and both bevel gears 22 and 23 transmit torque to this gear, which torque is transmitted through the collar 36 to the reverse shaft 34 and thence through spur gears 42 fixed on the outer ends of the reverse shaft. The spur gears 42 in turn transmit the drive through other spur gears 43 to the shaft 44 parallel to and below the reverse shaft 34. This shaft 44 is called the high speed clutch shaft and is mounted in bearings 45 supported on the lower portion 28 of the upper housing 26 on brackets 46; said bearings and brackets being in longitudinally spaced relation to said shaft, as clearly appears in Fig. 4. Two pinions 47 are fixedly mounted on the shaft 44 for low-speed drive and also the hub 48 of the piston clutch 49 through which drive may be transmitted selectively to the ring or hollow gear 50 for high-speed drive. The symmetrically arranged pinions 47 drive the two ring or hollow gears 51 associated with the low speed piston clutches 52, the hubs 53 of which are fixed on opposite ends of the shaft 54. The ring gears 50 and 51 form with their side plates 66 freely rotatable drums on their respective shafts 44 and 54. Shaft 54 is called the low speed clutch shaft and has an enlarged middle gear-toothed portion 55 forming a transfer gear, called the final drive pinion, between the gear 50 and the large gear 56 that constitutes the final driven gear carried on the jack shaft 15. The shaft 54 is also supported on the lower portion 28 of the upper housing 26 by means of bearings 57 which in turn are mounted in brackets 46 suitably fixed to the lower portion 28 of the housing 26. The brackets 46, as clearly appears in Fig. 3, are secured by means of studs 58 and nuts 59 to the lower portion 28 of the upper housing. Thus, it is evident that the upper housing 26, made up of the three parts 27, 28 and 46, can be lifted off the locomotive frame 11 carrying shafts 34, 44 and 54 with all of the gears and clutches carried thereon.

The jack shaft 15 is mounted in the main frame housing 20 in two large roller bearings 60 which are supported in the opposite end portions 61 of the lower gear housing cover 62 that is bolted to the bottom of the locomotive frame 11, as at 63, as well as doweled thereto, as indicated at 64. The straight horizontal portions 65 of the cover 62 add considerable strength and stiffness to the frame 11 and it is, of course, obvious that when the cover 62 is removed, the jack shaft 15 can be lowered and removed from the locomotive.

The high-speed clutch 49, consisting of the ring gear 50 on the opposite sides of which are fastened two side plates 66 having circular V-grooves 67 on the inside arranged to engage arcuate V-shaped projections 68 on the heads of the pistons 69 disposed in opposite ends of the parallel circumferentially spaced bores 70 in the hub 48, is similar to that shown in my Patent 2,333,-682, and copending application Serial No. 440,630. The low-speed clutches 52 on the shaft 54 are preferably of the same size and construction as the high-speed clutch 49. These clutches are selectively engaged by admitting lubricating oil under high pressure between the pistons, as for example, the pistons 69 in the clutch 49, high-speed drive being obtained when the clutch 49 is engaged and low-speed drive being obtained when the clutches 52 are engaged. The pistons are urged toward each other to disengaged position by coiled tension springs 71. Shafts 44 and 54 are provided with high pressure channels 72 and 73, respectively, and low pressure channels 74 and 75, respectively. The high pressure channels communicate with the piston bores in the hubs 48 of the clutches 49 and 52 for the purpose stated, and the low pressure channels conduct oil for lubricating purposes to the bearings for the side plates 66 of clutches 49 and 52.

In operating, for low-speed drive the power is transmitted from the diesel engines 9 and 10 through the torque converters 12 and couplings 13 to the bevel gears 22, 23, and 30, 31 and by means of the clutch collar 36 to the shaft 34, and thence through gears 42 and 43 to the shaft 44 and through pinions 47 and gears 51 and through the engaged low-speed clutches 52 to the shaft 54, and thence through gears 55 and 56 to the jack shaft 15. In high-speed drive the power is transmitted from the diesel engines 9 and 10 through torque converters 12 and couplings 13 to the bevel gears 22, 23 and 30, 31 and clutch collar 36 to the shaft 34, and thence through gears 42 and 43 to shaft 44, and through engaged high-speed clutch 49 to gear 50, and thence through gears 55 and 56 to the jack shaft 15. Obviously, since the gears 30 and 31 turn in opposite directions, reversal in the direction of drive is obtained merely by disengaging clutch collar 36 from gear 31 and engaging it with gear 30 and, of course, this reversal is obtainable in both low and high-speed drives. When only one diesel engine 21 is used, one bevel gear 22 transmits the drive to the drive gear unit 14 and, through the other three bevel gears 23, 30 and 31, the torque is transmitted through the clutch teeth 37—38 to the shaft 34, so that the gear teeth loads on the bevel gears in such a case are not any higher than when half that amount of power is transmitted to each of the bevel gears 22 and 23 from two engines 9 and 10. While the bevel gear 22 transmits part of the torque directly through bevel gear 31 and clutch collar 36 to the shaft 34, the other part is transmitted through bevel gears 30 and 23 to the diametrically opposite side of bevel gear 31 and thence through collar 36 to shaft 34. In other words, the provision of a cluster of four bevel gears results in a division of the load between the four bevel gears. To obtain most complete division of tooth load on the four bevel gears, a certain elastic deformation of the load carrying parts, including bevel gears, bearings, shafts, etc., is provided in the design of these parts, and the back lash in the teeth is kept relatively small. The use of three piston clutches 49 and 52 of equal dimensions and identical design and construction reduces manufacturing and service costs. The preferable speed ratio of high to low speed is around 2.5 to 1. To transform a high-speed passenger locomotive to a lower speed freight locomotive, I need only exchange the gears sets 42—43, which are herein shown as of a one to one ratio for high-speed passenger locomotive use, with other gear sets providing the desired reduction in speed, without making any other change in the transmission.

Gear transmissions for high-powered diesel locomotives have been proposed and made without the use of torque converters, necessitating three and more speed reduction gears, each speed step engageable by multiple disc clutches. The relative speed of the discs of such clutches in idling, particularly when running in high gear, caused excessive friction losses, particularly in the low-speed clutches, as a result of which the overall efficiency of such power transmissions was unsatisfactory. In the transmission of my invention, there are only low-speed and high-speed gears, and the relative speed between the clutch members is not appreciable, and inasmuch as the piston clutch engaging surfaces are positively retracted, friction losses during idling are negligible. The high-speed clutch shaft 44 and the low-speed clutch shaft 54 are preferably arranged in a horizontal plane beside each other, as clearly appears in Fig. 3, with the shaft 44 below the bevel gear shaft 34 and the shaft 54 above the jack shaft 15. With this arrangement of shafts, the desired location in the locomotive of the jack shaft 15 in the same horizontal plane with the shaft of the driving wheels and the bevel gear shaft 34 in the same horizontal plane with the engine shaft for high-powered diesel locomotives is obtained. That part of the locomotive frame 11 or 11', as the case may be, which forms the gear housing 20, is increased in height above the centers of the high and low-speed clutch shafts 44 and 54, as clearly appears in Figs. 1, 2 and 3, the main frame of the locomotive, including this gear housing 20, being preferably a steel casting or of welded steel construction, as previously mentioned, although the gear housing 20 may, of course, be bolted or riveted to the main frame of the locomotive. Fig. 4, as previously pointed out, is a section on the broken line 4—4 of Fig. 3, and that is why the shafts 34, 44, 54 and 15 appear above one another in this view, but it should be clear that this arrangement may be used in locomotives having diesel engines of lower horse power.

One of the torque converters 12 is shown in section in Fig. 5, in which the reference numeral 76 designates the crank shaft of the diesel engine 9. The housing 77 for the torque converter is bolted to the bell housing 78 of the diesel engine, and the crank shaft 76 of the engine drives the converter housing 79 to which is attached the pump element 80 of the torque converter. The turbine element 81 of the torque converter receives oil from the pump element 80 and is fastened by means of the flange 82 to the output shaft 83 onto which one element of the coupling 13 is fastened. 84 is the reaction member of the torque converter which receives oil from the turbine 81 and directs it back to the pump 80. The reaction member 84 is splined to a sleeve 85 that is rotatably mounted on the shaft 83. The hollow bracket 86 is fastened to the housing 77 and a one-way brake 87 is provided between the bracket 86 and the sleeve 85 to allow the reaction member 84 to "free-wheel" in the direction of rotation of the pump 80, but hold the reaction member 84 stationary when torque is applied to it by the oil in the opposite direction in the normal operation of the torque converter. A pilot bearing 88 in the end of the crank shaft 76 provides support for the front end of the output shaft 83, the other end being supported in a bearing 89 in the housing 77. Cooling oil is fed to the torque converter through channels 90 and 91 and is discharged through a channel 92 and another channel parallel to channel 90, and thence through a cooler (not shown) and back to the oil tank (not shown). The converter is kept continuously filled and under pressure by the circulation of the cooling oil therethrough. A ring gear 93 fastened to the pump 80 turns with the crank shaft of the engine driving an auxiliary gear 94 to provide for the driving of auxiliary pumps (not shown), like the cooling pump of the converter and a leakage pump which sucks the leakage oil from the lower part of housing 77 and returns it to the oil tank, and also may provide drive for high pressure and lubricating oil pumps for the drive gear unit 14.

Fig. 6 shows curves of the tractive effort in relation to speed of the locomotive in miles per hour, as well as the efficiency curves of the torque converter in low and high gear. The torque converter provides an automatic increase of the tractive effort at lower speeds in both gears. In low gear, high tractive effort is obtained at speeds from zero up to about 45 miles per hour, and lower tractive effort is obtained in high gear at higher speeds. The peak efficiency of the torque converter in both speed ranges is above 90°, and the torque converter operates in high speed ratios, as well as with light loads, at high efficiency in the hydraulic coupling speed range, where the reaction member 84 idles.

Although the shifting of the piston clutches from low to high gear, and from high to low gear, is done during the running of the locomotive, the shifting from forward to reverse by means of the clutch collar 36, which involves disengagement of the teeth 37 on the collar from the teeth 38 on one of the bevel gears 30 and 31, and engagement on the other of said bevel gears, is done when the locomotive and all the gears are standing still, and with that in view a zero speed blocking device may be provided, so that the shifting from forward to reverse is positively prevented so long as the gears are turning, a zero speed interlock blocking the admission of compressed air to either of the cylinders 41 so long as the gears are turning.

Referring to Fig. 7, the shafts 44 and 54 correspond to the same numbered shafts in Figs. 3 and 4, the shaft 44 carrying a gear 47 and ring gear 50 of the high speed clutch 49, and shaft 54 carrying the pinion 55 that transmits drive to the gear 56 on the jack shaft and a ring gear 51 associated with the low-speed clutch 52. Both shafts 44 and 54 have driving connections with differential gear sets 95 and 96 through two sets of bevel gears 101—104 and 111—114, respectively, the said differentials consisting of gears 105—108 and 115—118, respectively. The planetary gears of these differentials are mounted in the planetary gear housings 109 and 119, respectively, and drive through gears 120 and 130, respectively, the gears 121 and 131, on which the flyball governors 122 and 132 are mounted. The governors 122 and 132 operate sleeves 123 and 133 which are moved downwardly when the governor speed is increased and upwardly when the governor speed is decreased, whereby to operate valves 124 and 134, respectively. When the bevel gears 105 and 106 run at the same speed in opposite directions, the housing 109 stands still and the governor 122 accordingly does not turn and the flyballs are in their retracted position holding the valve 124 raised in open position, allowing oil to flow therethrough. Likewise, when the bevel gears 115 and 116 rotate in opposite directions at different speeds, the differential housing 119 turns at a differential speed, thereby driving the governor 132 and causing the flyballs to move outwardly and accordingly pull downwardly on the sleeve 133 and close the valve 134 to block the flow of oil therethrough. Oil flow through the valve 124 should be blocked until the clutch hub 49 and gear 50 are running at approximately the same speed, which is when the bevel gears 105 and 106 run at the same speed, so that the governor 122 is at a standstill. The ratios of the bevel gears 101 and 102, and of bevel gears 103 and 104, are selected so that bevel gears 105 and 106 turn at the same R. P. M. but in opposite directions when the clutch 49 and gear 50 run at the same speed, the aforesaid ratios being in direct relation to the ratio of the gears 50 and 55. Gear 50 runs at a lower speed than gear 55, with which it meshes, and, therefore, the bevel gears 104 and 103 have to increase the speed of the bevel gear 106 to equal the speed of gear 105, which is driven at a one to one gear ratio through bevel gears 101 and 102 from the gear 55. The same holds true for the drive for governor 132 and corresponding bevel gear ratios have to be selected in that case. Inasmuch as gear 51 turns at a lower speed than gear 47, with which it meshes, the bevel gears 112 and 111 are selected of a ratio to speed up the bevel gear 115, so that zero speed of the governor 132 is arrived at when the clutch hub 52 and gear 51 turn at approximately the same speed. To reduce the synchronizing energy in the piston clutches 49 and 52 to a minimum while shifting, the engine speed should be reduced while shifting from low to high speed and increased while shifting from high to low speed.

Figure 8:
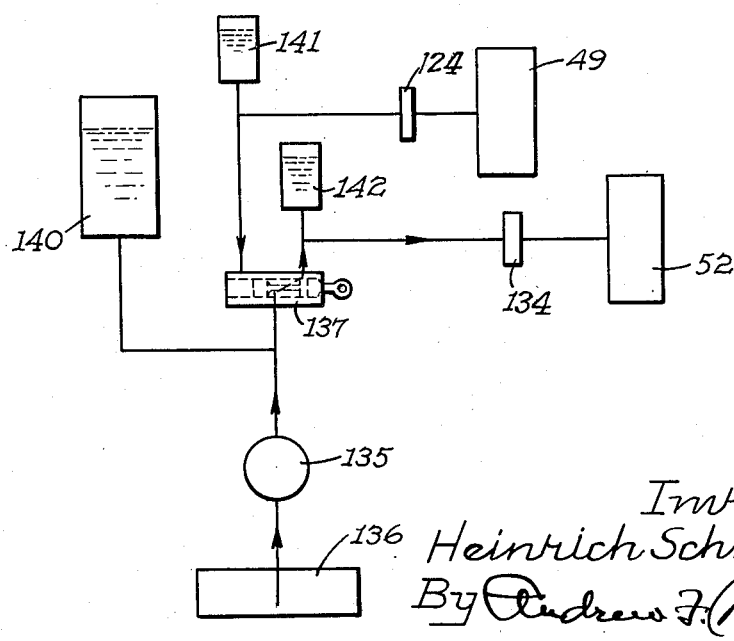
Fig. 8 is a diagram of the arrangement of the accumulators in the oil pipes showing the gear pump, selector valve and high and low-speed gear clutches.

To control the engagement of the piston clutches 49 and 52, the pressure increase and time period, hydraulic pressure rise control accumulators are preferably provided in the line between the control valve and each clutch, and another hydraulic storage accumulator is provided between the high pressure pump and the control valve, as disclosed in Fig. 8. The storage accumulator stores hydraulic energy to provide an instantaneous supply of high pressure fluid when the control valve is turned from one clutch to another, while the pressure rise control accumulator stores up fluid controlling the fluid pressure rise in relation to time while engaging the clutch. The sizes of both accumulators are proportioned in relation to the discharge of the pump and the desired time period of engagement. Spring or air vessel, or rubber-bag type accumulators are used, and by increasing the size of the pressure rise control accumulator the time period for engagement of the clutch can be increased and the engagement made as smooth as desired. Fig. 8 shows diagrammatically the arrangement of the accumulators in the oil lines, the reference numeral 135 indicating the gear pump, and 136 the oil tank from which it draws oil, 137 being the selector or shifter valve, the position of which determines whether oil is delivered to the low-speed clutch 52 or the high-speed clutch 49. 124 and 134 are the blocking valves shown in Fig. 7 arranged in the lines between the selector valve 137 and the clutches 49 and 52, respectively. 140 is the storage accumulator, and 141 and 142 are the pressure rise control accumulators.

It is believed the foregoing description conveys a good understanding of the objects and advantages of my invention. The appended claims have been drawn to cover all legitimate modifications and adaptations.

I claim:

1. A power transmission comprising, in combination, a pair of coaxially arranged driving shafts, a first cross-shaft, opposed forward and reverse bevel gears on the cross-shaft having clutch means for selectively clutching the gears in driving relation to the cross-shaft for reversible driving thereof, opposed bevel gears fixed on the driving shafts meshing with both of the aforesaid bevel gears, second and third and fourth shafts parallel with the cross-shaft, the fourth shaft being the final driven shaft and carrying a driven gear thereon, gears fixed on the ends of the first cross-shaft meshing with gears fixed on the ends of the second shaft to transmit drive thereto in either direction, a final drive pinion fixed on the third shaft meshing with the final driven gear to transmit drive thereto, a first ring gear loose on the second shaft meshing with the final drive pinion and forming therewith the high speed drive train, second ring gears loose on the third shaft arranged in symmetrical relation to the final drive pinion meshing with pinions fixed on the second shaft in symmetrical relation to the first ring gear and forming the low speed drive train, pressure fluid operated friction clutches arranged in said ring gears in coaxial relation therewith, and means for selectively conducting pressure fluid to said clutches.

2. A power transmission comprising, in combination, a driving shaft, a first cross-shaft, forward and reverse bevel gears on the cross-shaft having clutch means for selectively clutching the gears in driving relation to said cross-shaft for reversible driving thereof, a bevel gear fixed on the driving shaft meshing with both of the aforesaid bevel gears, second and third and fourth shafts parallel with the first cross-shaft, the fourth shaft being the final driven shaft and carrying a final driven gear thereon, gears fixed on the ends of the first cross-shaft meshing with gears fixed on the ends of the second shaft to transmit drive thereto in either direction, a final drive pinion fixed on the third shaft meshing with the final driven gear to transmit drive thereto, a first hollow gear loose on the second shaft meshing with the final drive pinion and forming therewith a high speed drive train, second hollow gears loose on the third shaft arranged in symmetrical relation to the final drive pinion meshing with pinions fixed on the second shaft in symmetrical relation to the first hollow gear and forming low speed drive trains, pressure fluid operated friction clutches arranged in said hollow gears in coaxial relation therewith, and means for selectively conducting pressure fluid to said clutches.

3. A power transmission comprising, in combination, a pair of coaxially arranged driving shafts, a first cross-shaft, opposed forward and reverse bevel gears on the cross-shaft having clutch means for selectively clutching the gears in driving relation to the cross-shaft for reversible driving thereof, opposed bevel gears fixed on the driving shafts meshing with both of the aforesaid bevel gears, second and third and fourth shafts parallel with the cross-shaft, the fourth shaft being the final driven shaft and carrying a final driven gear thereon, gears fixed on the ends of the first cross-shaft meshing with gears fixed on the ends of the second shaft to transmit drive thereto in either direction, a final drive pinion fixed on the third shaft meshing with the final driven gear to transmit drive thereto, a first hollow gear loose on the second shaft meshing with the final drive pinion and forming therewith a high speed drive train, second hollow gears loose on the third shaft arranged in symmetrical relation to the final drive pinion meshing with pinions fixed on the second shaft in symmetrical relation to the first hollow gear and forming low speed drive trains, pressure fluid operated friction clutches arranged in said hollow gears in coaxial relation therewith, and means for selectively conducting pressure fluid to said clutches.

4. A power transmission comprising four gear-carrying parallel shafts including a reverse shaft carrying means for forward and reverse drive, a high speed clutch shaft carrying gears meshing with gears on the reverse shaft, a low speed clutch shaft carrying loosely gears in mesh with gears fixed on the high speed clutch shaft, and a driven shaft carrying a final driven gear in mesh with a pinion fixed on the low speed clutch shaft which in turn meshes with a gear loosely carried on the high speed clutch shaft, the transmission including clutch means for selectively drivingly engaging the loose gears on the high and low speed clutch shafts.

5. A power transmission as set forth in claim 4 wherein the means for forward and reverse drive comprises two bevel gears coaxial with the reverse shaft, and clutch means on said shaft and bevel gears to engage and disengage either of the bevel gears with said shaft.

6. A power transmission for locomotives comprising four gear-carrying parallel shafts including a reverse shaft carrying means for forward and reverse drive, a high speed clutch shaft carrying gears meshing with gears on the reverse shaft, a low speed clutch shaft carrying loosely gears in mesh with gears fixed on the high speed clutch shaft, and a driven shaft carrying a final driven gear in mesh with a pinion fixed on the low speed clutch shaft which in turn meshes with a gear loosely carried on the high speed clutch shaft, the high speed clutch shaft and the low speed clutch shaft being arranged substantially horizontally alongside one another, said reverse shaft being above said high speed clutch shaft, and said driven shaft being below said low speed clutch shaft, the transmission including clutch means for selectively drivingly engaging the loose gears on the high and low speed clutch shafts.

7. A power transmission for a locomotive, comprising, in combination, with the locomotive frame, a transmission housing including a lower housing section in said frame and an upper housing section above said frame, three parallel gear carrying shafts mounted on said upper housing section including a reverse shaft carrying means for forward and reverse drive, a high speed clutch shaft carrying gears meshing with gears on the reverse shaft, and a low speed clutch shaft carrying loosely gears in mesh with gears fixed on the high speed clutch shaft, and a final driven shaft mounted in the lower housing section in said locomotive frame connectible in driving relationship with said high speed clutch shaft through a final drive pinion on the low speed clutch shaft.

8. A power transmission as set forth in claim 7 including bearing bracket means carried on said upper housing section and projecting downwardly into the lower housing section, said low speed and high speed clutch shafts being carried in said bracket means below the horizontal plane of division between the upper and lower housing sections.

9. In a locomotive power transmission, a driven shaft having a centrally arranged final driven gear, a low gear clutch shaft having thereon a centrally arranged final drive pinion meshing with the final driven gear, and symmetrically arranged low speed clutch gears, a high gear clutch shaft having thereon a centrally arranged high speed clutch gear meshing with the pinion on the low gear clutch shaft and symmetrically arranged gears meshing with the aforesaid low speed clutch gears and also symmetrically arranged drive gears on the end portions of said shaft, a forward and reverse shaft having symmetrically arranged drive gears on the end portions thereof meshing with the last mentioned drive gears, clutches on said clutch gears, means for selectively engaging said clutches for high or low speed drive, and means transmitting drive to said forward and reverse shaft.

10. A power transmission for a locomotive, comprising, in combination, with the locomotive frame, a transmission housing including a lower housing section in said frame and an upper housing section above said frame, three parallel gear carrying shafts mounted on said upper housing section including a reverse shaft carrying means for forward and reverse drive, a high speed clutch shaft carrying gears meshing with gears on the reverse shaft, and a low speed clutch shaft carrying loosely gears in mesh with gears fixed on the high speed clutch shaft, a final driven shaft mounted in the lower housing section in said locomotive frame connectible in driving relationship with said high speed clutch shaft, bearings for said final driven shaft demountably engaged in the frame for removal downwardly therefrom with said shaft, and a bottom cover for the lower housing section detachably secured to the bottom of said frame and retaining said bearings and shaft against downward displacement.

11. In a power transmission, the combination of two parallel shafts interconnectible by high and low speed reduction gears provided thereon, the high speed reduction gears including a high speed clutch gear loosely mounted on one of said shafts, the low speed reduction gears including a low speed clutch gear loosely mounted on the other of said shafts, means for transmitting drive from a power source to one of said shafts and for transmitting drive from the other of said shafts to a driven member, pressure fluid operated friction clutches fixed on said shafts for clutching said clutch gears to said shafts selectively, valve means for selectively delivering pressure fluid from said source to either of said clutches for high or low speed drive, a pressure fluid source, and means for blocking fluid from reaching either of said clutches so long as the relative speed between a clutch and clutch gear exceeds a predetermined value.

12. A power transmission as set forth in claim 11 including a governor, a governor operated valve controlling flow of pressure fluid to a clutch, and a differential device for driving said governor, driven from one side at a speed proportionate to the clutch gear speed and from the other side at a speed proportionate to the speed of the associated clutch shaft, whereby said governor is turned at a differential speed and its speed becomes zero when the clutch gear and the clutch shaft run at the same speed.

13. In a power transmission, the combination of two parallel shafts interconnectible by high and low speed reduction gears provided thereon, the high speed reduction gears including a high speed clutch gear loosely mounted on one of said shafts, the low speed reduction gears including a low speed clutch gear loosely mounted on the other of said shafts, means for transmitting drive from a power source to one of said shafts and for transmitting drive from the other of said shafts to a driven member, pressure fluid operated friction clutches fixed on said shafts for clutching said clutch gears to said shafts selectively, a pressure fluid source, valve means for selectively delivering pressure fluid from said source to either of said clutches for high or low speed drive, a pressure storage accumulator connected between the source and said valve means, and a pressure rise control accumulator for each of said clutches connected between the valve means and the clutch.

14. A power transmission as set forth in claim 13 including means for blocking pressure fluid flow to either of said clutches so long as the relative speed between a clutch and clutch gear exceeds a predetermined value.

15. A locomotive power transmission as set forth in claim 9 including a horizontal frame and a sectional housing divided horizontally, the lower section being within the frame and having a removable bottom plate detachably secured to the bottom of the frame, and an upper section detachably secured to the top of the frame, said driven shaft being removably mounted in the lower portion of the frame and retained by said bottom plate, the other shafts being carried on the upper housing section and removable therewith from said frame.

16. A power transmission comprising, in combination, a reverse shaft, a final driven shaft in spaced parallel relation thereto having a final driven gear thereon, a low speed clutch shaft parallel to the other shafts having a final drive pinion in mesh with the final driven gear to transmit drive thereto, a high speed clutch shaft parallel to the other shafts, a freely rotatable ring gear on the high speed clutch shaft meshing with the final drive pinion to complete the high speed drive train, a low speed pinion on the high speed drive clutch shaft meshing with a freely rotatable ring gear on the low speed clutch shaft to complete the low speed drive train, pressure fluid operated friction clutches arranged in said ring gears in coaxial relation therewith, and means for selectively conducting pressure fluid to said clutches.

17. A power transmission comprising, in combination, a reverse shaft, a final driven shaft in spaced parallel relation thereto having a final driven gear thereon, a low speed clutch shaft parallel to the other shafts having a final drive pinion in mesh with the final driven gear to transmit drive thereto, a high speed clutch shaft parallel to the other shafts, a freely rotatable ring gear on the high speed clutch shaft meshing with the final drive pinion to complete a high speed drive train, two gears on the high speed clutch shaft in symmetrical relation to said ring gear and meshing with other ring gears on the low speed clutch shaft to complete a low speed drive train, the last mentioned ring gears being arranged in symmetrical relation to said final drive pinion, pressure fluid operated friction clutches arranged in said ring gears in coaxial relation therewith, and means for selectively conducting pressure fluid to said clutches.

18. A power transmission comprising in combination, a driving shaft, a reverse shaft in crosswise relation thereto with forward and reverse bevel gears thereon and clutch means for selectively clutching said gears in driving relation to said reverse shaft for reversible driving thereof, a bevel gear fixed on the driving shaft meshing with both of the aforesaid bevel gears, a high speed clutch shaft, a low speed clutch shaft, and a final driven shaft parallel with the reverse shaft, the driven shaft carrying a final driven gear thereon, gears fixed on the ends of the reverse shaft meshing with gears fixed on the ends of the high speed clutch shaft to transmit drive thereto in either direction, a final drive pinion fixed on the low speed clutch shaft meshing with the final driven gear to transmit drive thereto, a ring gear loose on the high speed clutch shaft meshing with a final drive pinion and forming therewith the high speed drive train, ring gears loose on the low speed clutch shaft in symmetrical relation to the final drive pinion meshing with pinions fixed on the high speed clutch shaft in symmetrical relation to the first mentioned ring gear and forming the low speed drive train, pressure fluid operated clutches arranged in said ring gears in coaxial relation therewith, and means for selectively conducting pressure fluid to said clutches.

19. In a locomotive power transmission, the combination with the locomotive frame, of a transmission housing including a lower fixed housing section in said frame, an upper demountable housing section above said frame, and a removable bottom plate detachably secured to the bottom of the frame to complete the transmission housing, a driven shaft removably mounted in the lower portion of the frame and retained in operative position by said bottom plate, a drive shaft above the frame detachably connectible by means of a coupling with an auxiliary drive shaft journaled in the upper demountable section of said housing, the auxiliary drive shaft carrying a bevel gear on its inner end meshing with opposed bevel gears loosely mounted on a cross-shaft mounted in the upper section of said housing, means for clutching either of said opposed bevel gears to said cross-shaft, a high speed clutch shaft mounted in the upper section of said housing below the cross-shaft and carrying gears meshing with gears on the cross-shaft, a low speed clutch shaft also mounted in the upper section of said housing below the cross-shaft carrying loosely gears in mesh with gears fixed on the high speed clutch shaft, a drive pinion fixed on the low speed clutch shaft meshing with a final driven gear on the first mentioned driven shaft and also meshing with a gear loosely mounted on the high speed clutch shaft, and means for selectively clutching the loose gears on said high and low speed clutch shafts.

20. A locomotive power transmission as set forth in claim 19, including another drive shaft above the locomotive frame in coaxial opposed relation to the first mentioned drive shaft, and detachably connectible by means of a coupling with another auxiliary drive shaft journaled in the upper demountable section of said housing, said last mentioned auxiliary drive shaft carrying a bevel gear on its inner end in opposed coaxial relation to the bevel gear on the other auxiliary drive shaft and meshing with the opposed bevel gears on the cross-shaft.

21. In a locomotive power transmission, the combination with the locomotive frame, of a transmission housing including a lower fixed housing section in said frame, an upper demountable housing section above said frame, and a removable bottom plate detachably secured to the bottom of the frame to complete the transmission housing, a driven shaft removably mounted in the lower portion of the frame and retained in operative position by said bottom plate, a drive shaft above the frame detachably connectible by means of a coupling with an auxiliary drive shaft journaled in the upper demountable section of said housing, the auxiliary drive shaft carrying a bevel gear on its inner end meshing with opposed bevel gears loosely mounted on a cross-shaft mounted in the upper section of said housing, means for clutching either of said opposed bevel gears to said cross-shaft, a driven gear on the first mentioned driven shaft within said housing, and intermediate gearing in said housing drivingly connecting said last mentioned gear with gears fixed on the cross-shaft.

22. A locomotive power transmission as set forth in claim 21, including another drive shaft above the locomotive frame in coaxial opposed relation to the first mentioned drive shaft, and detachably connectible by means of a coupling with another auxiliary drive shaft journaled in the upper demountable section of said housing, said last mentioned auxiliary drive shaft carrying a bevel gear on its inner end in opposed coaxial relation to the bevel gear on the other auxiliary drive shaft and meshing with the opposed bevel gears on the cross-shaft.

23. A power transmission comprising, in combination, a driving shaft, a first cross-shaft, forward and reverse bevel gears on the cross-shaft having clutch means for selectively clutching the gears in driving relation to said cross-shaft for reversible driving thereof, a bevel gear fixed on the driving shaft meshing with both of the aforesaid bevel gears, second and third and fourth shafts parallel with the cross-shaft, the fourth shaft being the final driven shaft and carrying a driven gear thereon, gears fixed on the ends of the first cross-shaft meshing with gears fixed on the ends of the second shaft to transmit drive thereto in either direction, a final drive pinion fixed on the third shaft meshing with the final driven gear to transmit drive thereto, a first clutchable gear loose on the second shaft meshing with the final drive pinion and forming therewith the high speed drive train, second clutchable gears loose on the third shaft arranged in symmetrical relation to the final drive pinion meshing with pinions fixed on the second shaft in symmetrical relation to the first clutchable gear and forming the low speed drive train, clutches arranged to make said clutchable gears fixed to the associated shafts, and means for selectively operating said clutches.

24. A power transmission comprising, in combination, a driving shaft, a first cross-shaft, forward and reverse bevel gears on the cross-shaft having clutch means for selectively clutching the gears in driving relation to said cross-shaft for reversible driving thereof, a bevel gear fixed on the driving shaft meshing with both of the aforesaid bevel gears, second and third and fourth shafts parallel with the first cross-shaft, the fourth shaft being the final driven shaft carrying a final driven gear thereon, gears fixed on the ends of the first cross-shaft meshing with gears fixed on the ends of the second shaft to transmit drive thereto in either direction, a final drive pinion fixed on the third shaft meshing with the final driven gear to transmit drive thereto, a first hollow gear loose on the second shaft meshing with the final drive pinion and forming therewith a high speed speed drive train, second hollow gears loose on the third shaft arranged in symmetrical relation to the final drive pinion meshing with pinions fixed on the second shaft in symmetrical relation to the first hollow gear and forming low speed drive trains, clutches arranged in said hollow gears in coaxial relation therewith, and means for selectively operating said clutches.

25. A power transmission for a locomotive, comprising, in combination with a locomotive frame, a transmission housing including a lower housing section in said frame and an upper housing section above said frame, four gear carrying parallel shafts, three of which are mounted on the upper housing section, the three including a reverse shaft carrying means for forward and reverse drive, a high speed clutch shaft carrying gears meshing with gears on the reverse shaft, and a lower speed clutch shaft carrying loosely gears in mesh with gears fixed on the high speed clutch shaft, the high speed clutch and the low speed clutch shaft being arranged substantially horizontally alongside one another, said reverse shaft being above said high speed clutch shaft, the fourth shaft being a final driven shaft below said low speed clutch shaft mounted in the lower housing section in said locomotive frame connectible in driving relationship with said high speed clutch shaft through a final drive pinion on the low speed clutch shaft, which, in turn, meshes with a gear loosely carried on the high speed clutch shaft, the transmission including clutch means for selectively drivingly engaging the loose gears on the high and low speed clutch shafts.

26. A power transmission as set forth in claim 25, including bearing bracket means carried on said upper housing section and projecting downwardly into the lower housing section, said low speed and high speed clutch shafts being carried in said bracket means below the horizontal plane of division between the upper and lower housing sections.

27. A power transmission for a locomotive, comprising, in combination with a locomotive frame, a transmission housing including a lower housing section in said frame and an upper housing section above said frame, three parallel gear carrying shafts mounted on said upper housing section including a reverse shaft carrying means for forward and reverse drive, a high speed clutch shaft carrying gears meshing with gears on the reverse shaft and a low speed clutch shaft carrying loosely gears in mesh with gears fixed on the high speed clutch shaft, a final driven shaft mounted in the lower housing section in said locomotive frame connectible in driving relationship with said high speed clutch shaft, bearings for said final driven shaft demountably engaged in the frame for removal downwardly therefrom with said shaft, and means for retaining said bearings and shaft against downward displacement relative to said frame and lower housing section.

HEINRICH SCHNEIDER.

REFERENCES CITED

The following references are of record in the file of this patent:

UNITED STATES PATENTS

| Number | Name | Date |
|---|---|---|
| 951,062 | Ehle | Mar. 1, 1910 |
| 1,324,592 | Hicks | Dec. 9, 1919 |
| 1,447,488 | Schneider | Mar. 6, 1923 |
| 1,850,290 | Schneider | Mar. 22, 1932 |
| 2,131,531 | Behrens | Sept. 27, 1938 |
| 2,155,434 | Marsh | Apr. 25, 1939 |
| 2,205,300 | Marsh | June 18, 1940 |
| 2,303,738 | Harrison | Dec. 1, 1942 |
| 2,304,032 | Schmitter | Dec. 1, 1942 |
| 2,333,682 | Schneider | Nov. 9, 1943 |

FOREIGN PATENTS

| Number | Country | Date |
|---|---|---|
| 645,201 | France | June 26, 1928 |